US012634886B2

(12) United States Patent
Fu

(10) Patent No.: US 12,634,886 B2
(45) Date of Patent: May 19, 2026

(54) METHOD FOR SENDING PAGING EARLY INDICATION AND METHOD FOR RECEIVING PAGING EARLY INDICATION

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 435 days.

(21) Appl. No.: 18/261,132

(22) PCT Filed: Jan. 14, 2021

(86) PCT No.: PCT/CN2021/071806
§ 371 (c)(1),
(2) Date: Jul. 12, 2023

(87) PCT Pub. No.: WO2022/151172
PCT Pub. Date: Jul. 21, 2022

(65) Prior Publication Data
US 2024/0089919 A1     Mar. 14, 2024

(51) Int. Cl.
*H04W 68/00* (2009.01)
*H04W 68/02* (2009.01)
(52) U.S. Cl.
CPC ......... *H04W 68/02* (2013.01); *H04W 68/005* (2013.01)

(58) Field of Classification Search
None
See application file for complete search history.

(56) References Cited

PUBLICATIONS

3GPP TSG RAN WG1 #103-e e-Meeting, Oct. 26-Nov. 13, 2020, (Year: 2020).*
International Search Report & Written Opinion Issued Mar. 24, 2021, in PCT/CN2021/071806, filed on Jan. 14, 2021, citing document 24 therein, 15 pages.
MediaTek Inc., "Paging Enhancements for Idle/Inactive-Mode UE Power Saving", 3GPP TSG RAN WG1 # 103-e R1 2008964, Nov. 1, 2020, 10 pages.

* cited by examiner

*Primary Examiner* — Gary Lafontant
(74) *Attorney, Agent, or Firm* — Oblon, McClelland, Maier & Neustadt, L.L.P.

(57) ABSTRACT

A method for sending a paging early indication (PEI) is performed by a base station and includes: in response to a conflict between the PEI to be sent and other information or other channel, determining a processing manner for the PEI based on the other information or the other channel. A method for receiving a PEI is performed by a user equipment and includes: in response to a conflict between the PEI to be received and other information or other channel, determining a receiving manner for the PEI based on the other information or the other channel.

15 Claims, 3 Drawing Sheets

S101 in response to a conflict between the paging early indication (PEI) to be sent and other information or other channel, determining a processing manner for the PEI based on the other information or the other channel

S101 in response to a conflict between the paging early indication (PEI) to be sent and other information or other channel, determining a processing manner for the PEI based on the other information or the other channel

FIG. 1

S201 in response to a conflict between the paging early indication (PEI) to be received and other information or other channel, determining a receiving manner for the PEI based on the other information or the other channel

FIG. 2

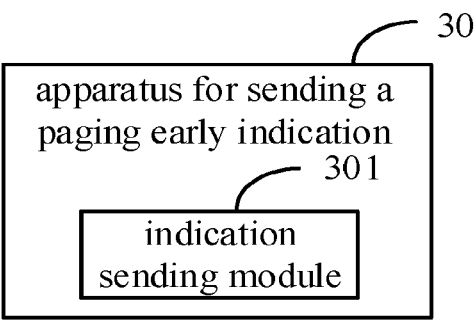

30 apparatus for sending a paging early indication

301 indication sending module

FIG. 3

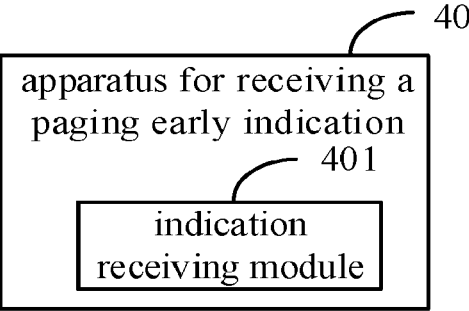

40 apparatus for receiving a paging early indication

401 indication receiving module

FIG. 4

METHOD FOR SENDING PAGING EARLY INDICATION AND METHOD FOR RECEIVING PAGING EARLY INDICATION

CROSS-REFERENCE TO RELATED APPLICATIONS

The present application is a National Stage of International Application No. PCT/CN2021/071806, filed on Jan. 14, 2021, the contents of which are incorporated herein by reference for all purposes.

BACKGROUND

Technical Field

The present disclosure relates to a technical field of communication, and more particularly to a method and an apparatus for sending a paging early indication, a method and an apparatus for receiving a paging early indication, an electronic device, and a computer-readable storage medium.

Description of the Related Art

When a user equipment is in a non-connected state, the user equipment can periodically monitor a paging message, and can enter a connected state after receiving the paging message. The paging message can be carried in a physical downlink share channel (referred to as PDSCH), and the PDSCH can be scheduled by paging downlink control information (referred to as DCI). The user equipment can monitor the paging DCI through a paging occasion (referred to as PO) to determine whether the paging DCI schedules the PDSCH containing the paging message, then receiving the PDSCH according to a resource specifically indicated by the paging DCI.

In order to save power, the user equipment can go to sleep in the non-connected state and wake up periodically to monitor the paging DCI during the PO, but there is still relatively large power consumption in the periodic wakeup, therefore a scheme is proposed for a base station to send a paging early indication (referred to as PEI) to the user equipment in the related art. The base station may send the PEI corresponding to the PO to the user equipment, and according to the PEI, may indicate whether the user equipment needs to monitor the paging DCI in one or more POs corresponding to the PEI.

SUMMARY

Embodiments of the present disclosure provide a method and an apparatus for sending a paging early indication, and a method and an apparatus for receiving a paging early indication to solve technical problems in the related art.

According to a first aspect of embodiments of the present disclosure, a method for sending a paging early indication (PEI) is provided, performed by a base station and including: in response to a conflict between the PEI to be sent and other information or other channel, determining a processing manner for the PEI based on the other information or the other channel.

According to a second aspect of embodiments of the present disclosure, a method for receiving a paging early indication (PEI) is provided, performed by a user equipment and including, in response to a conflict between the PEI to be received and other information or other channel, determining a receiving manner for the PEI based on the other information or the other channel.

According to a third aspect of embodiments of the present disclosure, an apparatus for sending a paging early indication (PEI) is provided, applied to a base station and including: an indication sending module configured to, in response to a conflict between the PEI to be sent and other information or other channel, determine a processing manner for the PEI based on the other information or the other channel.

According to a fourth aspect of embodiments of the present disclosure, an apparatus for receiving a paging early indication (PEI) is provided, applied to a user equipment and including: an indication receiving module configured to, in response to a conflict between the PEI to be received and other information or other channel, determine a receiving manner for the PEI based on the other information or the other channel.

According to a fifth aspect of embodiments of the present disclosure, an electronic device is provided, including: a processor; and a memory configured to store instructions executable by the processor. The processor is configured to implement the above-described method in the first aspect and/or the second aspect.

According to a sixth aspect of embodiments of the present disclosure, a non-transitory computer-readable storage medium is provided, having stored therein computer programs that, when executed by a processor, cause a step of the method described in the first aspect and/or the second aspect to be implemented.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic flowchart showing a method for sending a paging early indication according to an embodiment of the present disclosure.

FIG. 2 is a schematic flowchart showing a method for receiving a paging early indication according to an embodiment of the present disclosure.

FIG. 3 is a schematic block diagram showing an apparatus for sending a paging early indication according to an embodiment of the present disclosure.

FIG. 4 is a schematic block diagram showing an apparatus for receiving a paging early indication according to an embodiment of the present disclosure.

DETAILED DESCRIPTION OF THE PREFERRED EMBODIMENTS

Figure 5:
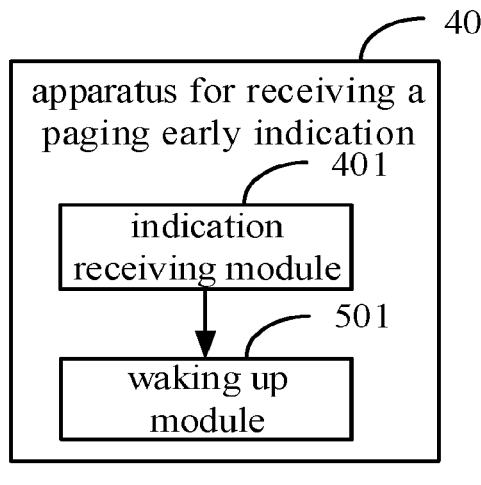
FIG. 5 is a schematic block diagram showing another apparatus for receiving a paging early indication according to an embodiment of the present disclosure.

Referring now to the drawings, wherein like reference numerals designate identical or corresponding parts throughout the several views.

The technical solutions in embodiments of the present disclosure will be described clearly and completely below with reference to the accompanying drawings in embodiments of the present disclosure. Apparently, the described embodiments are only some embodiments of the present disclosure, rather than all embodiments of the present disclosure. All other embodiments obtained by those ordinarily skilled in the art based on embodiments of the present disclosure without making creative works belong to the protection scope of the present disclosure.

In order to reduce power consumption, a user equipment (UE) can go to sleep in a non-connected state, and wake up periodically before a PO to monitor whether paging DCI exists during the PO. If the DCI is detected during the PO and the DCI schedules a PDSCH containing a paging message, the user equipment receives the PDSCH according to a specific instruction of the DCI. If the DCI is not detected in the PO, or the DCI is detected, but the DCI does not schedule the PDSCH containing the paging message, the user equipment does not need to receive the PDSCH.

In order to further reduce the power consumption, in the related art, a base station may further send a PEI corresponding to the PO to the user equipment, and may instruct, with the PEI, the user equipment whether to monitor the DCI during the PO corresponding to the PEI nor not. For example, if the PEI indicates that the user equipment needs to monitor the DCI in the corresponding PO, the user equipment can wake up before the PO and monitor the DCI in the PO. If the PEI indicates that the user equipment does not need to monitor the DCI in the corresponding PO, the user equipment can stay asleep without waking up in the corresponding PO, so that the user equipment may reduce unnecessary power consumption.

However, the PEI to be sent by the base station may conflict with other channel or other information, resulting in problems such as abnormalities in sending the PEI by the base station and abnormalities in receiving the PEI by the user equipment. In view of this, a method for sending a paging early indication is provided in embodiments of the present disclosure. In the methods of these embodiments, for a conflicting PEI to be sent, corresponding processing can be performed based on a type of the other information or the other channel related to the transmission conflict, so as to avoid the abnormalities.

FIG. 1 is a schematic flowchart showing a method for sending a paging early indication according to an embodiment of the present disclosure. The method for sending the paging early indication shown in this embodiment can be performed by a base station, and the base station includes, but is not limited to, a 4G base station, a 5G base station, or a 6G base station. The base station may communicate with a terminal serving as a user equipment, and the user equipment includes, but is not limited to, electronic devices such as a mobile phone, a tablet computer, a wearable device, a sensor, an Internet of Things device, etc. In an embodiment, the user equipment may be any user equipment to which a method for receiving a paging early indication is applicable described in any one of subsequent embodiments.

As shown in FIG. 1, the method for sending the paging early indication includes the following step.

In S101, in response to a conflict between the paging early indication (PEI) to be sent and other information or other channel, a processing manner for the PEI is determined based on the other information or the other channel.

In an embodiment, the base station may send the PEI to the user equipment before a PO, for example, may send the PEI at a specified time interval (for example, a duration is N)

before the PO, so as to instruct the user equipment to determine whether to wake up at the PO according to the PEI.

In an embodiment, the base station is capable of predetermining the conflict between the PEI to be sent and the other information or the other channel. For example, if a time-frequency resource configured to send the PEI is overlapped with a time-frequency resource required by the other information that the base station needs to send, the conflict may be determined between the PEI and the other information. In an embodiment, the other information that the base station needs to send may be information sent by the base station to the user equipment, or information sent by the base station to other base stations.

For another example, if the resource configured to send the PEI is configured as an uplink resource, for example, configured as an uplink symbol, the conflict may be determined between the PEI and the other channel.

In an embodiment, when the conflict is determined between the PEI and the other information or the other channel, the base station may determine a processing manner for the PEI based on the other information or other channel in the conflict. For example, the base station may process the PEI in at least one of the following manners: discarding the PEI; deferring sending the PEI; sending the PEI, and punching the other information in the PEI.

The base station may also process the PEI in other manners, for example, it can compare a priority of the PEI and a priority of the other information in the conflict, and send the one with a higher priority at an original time-frequency position. The above embodiments are only illustrative descriptions, and are not specifically limited.

So far, the embodiment shown in FIG. 1 has been completed. According to the embodiment shown in FIG. 1, the base station can determine the conflict between the PEI to be sent and the other information or the other channel, and thus the specific manner for processing the PEI can be determined according to the other information or the other channel. Therefore, the base station can flexibly handle various conflict situations to avoid sending abnormalities.

In an embodiment, the other information or the other channel includes at least one of following: the other information or the other channel for which the user equipment is capable of predetermining a resource, and the other information or the other channel for which the user equipment is incapable of predetermining the resource.

For the above two cases of whether the user equipment is capable of predetermining the resource, the base station may process the PEI in different manners, which will be introduced in combination with specific examples below.

Example 1: the other information or the other channel is the other information or the other channel for which the user equipment is incapable of predetermining the resource.

In an embodiment, the other information is sent in a non-broadcast manner such as a multicast or a unicast manner, and the user equipment is incapable of predetermining the resource used for the other information sent in the non-broadcast manner. In another embodiment, the other channel may be assigned to a specific user equipment according to user equipment-specific information, and the user equipment of the PEI to be received is incapable of predetermining the resource corresponding to the other channel, so the user equipment is incapable of predicting the conflict between the PEI and the other information or the other channel.

Based on this, in an embodiment, for the base station, in response to determining that the other information or the other channel is the other information or the other channel for which the user equipment is incapable of predetermining the resource, the processing manner includes: discarding the PEI.

It should be noted that if the user equipment is incapable of predicting that the resource used by the PEI is overlapped with the resource used by the other information, or if the user equipment is incapable of predicting that the channel used by the PEI is configured as the uplink channel, that is, the user equipment is incapable of predicting this conflict, the base station can only discard the PEI.

In an embodiment, after the base station discards the PEI, the user equipment is incapable of receiving the PEI. In order to avoid user equipment abnormalities, a default processing method of the user equipment is pre-agreed when the PEI is not received. For example, in response to not receiving the PEI, the user equipment can wake up before the PO corresponding to the PEI, so as to monitor whether paging DCI is transmitted in the PO.

In an embodiment, the other information for which the user equipment is incapable of predetermining the resource includes at least one of following:

1. a physical downlink shared channel (PDSCH) sent in a multicast manner to the user equipment in a non-connected state; for example, the PDSCH may be a PDSCH carrying a random access response (RAR)/paging message;

2. a physical downlink control channel (PDCCH) or the physical downlink shared channel (PDSCH) sent to the user equipment in a connected state;

3. a channel state information reference signal (CSI-RS) or a user equipment specific positioning reference signal (UE specific PRS) sent to the user equipment in the connected state; and 4. a remote interference management reference signal (RIM-RS).

In an embodiment, the other channel for which the user equipment is incapable of predetermining the resource includes at least one of following:

1. an uplink symbol indicated by a user equipment specific uplink/downlink configuration (UE specific UL/DL configuration); and 2. an uplink symbol indicated by a slot format indication (SFI); for example, the SFI may be included in UE specific DCI to dynamically indicate an uplink/downlink resource allocation to a specific user equipment.

It should be noted that the information and the channel for which the user equipment is incapable of predetermining the resource in the above embodiments are only examples, and in practical applications, may further include other information, or an uplink channel indicated in other manner, which is not limited in the embodiment.

Example 2: the other information or the other channel is the other information or the other channel for which the user equipment is capable of predetermining the resource.

In an embodiment, the other information may be sent by the base station in a broadcast manner, and the user equipment is capable of predetermining the resource used for the other information sent in the broadcast manner. In another embodiment, the other channel is pre-agreed by the base station and the user equipment, or assigned by the base station to the user equipment through the broadcast information, and the user equipment is capable of predetermining the resource corresponding to the other channel.

On this basis, in an embodiment, for the base station, in response to determining that the other information or the other channel is the other information or the other channel for which the user equipment is capable of predetermining the resource, the processing manner includes at least one of following: discarding the PEI; deferring sending the PEI; and sending the PEI and punching the other information in the PEI.

It should be noted that if the user equipment is capable of predicting that the resource used by the PEI is overlapped with the resource used by the other information, or if the user equipment is capable of predicting that the channel used by the PEI is configured as the uplink channel, the user equipment is capable of predicting the conflict. Therefore, processing manners for different conflicts can be pre-agreed by the base station and the user equipment, so that the base station processes the PEI according to the pre-defined manner.

In an embodiment, the other information or the other channel for which the user equipment is capable of predetermining the resource may also include two situations, and different manners for processing the PEI may also be determined for the different situations, which will be described as Example 2.1 and Example 2.2 below.

Example 2.1: the PEI to be sent is in conflict with first information for which the user equipment is capable of predetermining the resource, or in conflict with the other channel for which the user equipment is capable of predetermining the resource.

In an embodiment, the first information is continuous in a frequency domain, or it is uncertain whether the first information is continuous in the frequency domain. It should be noted that if the first information is continuous in the frequency domain, or it is uncertain whether the first information is continuous in the frequency domain, the first information and the PEI cannot be sent simultaneously by using a punching manner. Therefore, the base station can directly discard the PEI, or defer sending the PEI.

In an embodiment, if the resource required for the PEI to be sent is an uplink channel, the PEI is in conflict with the uplink channel. The base station cannot send the PEI on the uplink channel. Therefore, the base station can directly discard the PEI, or defer sending the PEI.

For example, the first information may include at least one of following:

1. a synchronization sequence block (SSB);

2. a common search space (CSS) of a PDCCH, where the CSS is defined according to a protocol or configured by a broadcast channel, and a type of the CSS is Type0/0A/1/2; and 3. a PDSCH, where the PDSCH is configured to carry a system information block (SIB1) or broadcast system information (SI).

For example, the above other channel for which the user equipment is capable of predetermining the resource may include: an uplink symbol indicated by uplink/downlink configuration (UL/DL configuration) in system information.

In an embodiment, in response to the conflict between the PEI to be sent and the first information for which the user equipment is capable of predetermining the resource, or between the PEI to be sent and the other channel for which the user equipment is capable of predetermining the resource, the base station defers sending the PEI. Based on this, in an embodiment, in response to the conflict between the PEI to be sent and the first information, or the conflict between the PEI to be sent and the other channel of the user equipment, the user equipment defers receiving the PEI.

It should be noted that the above processing manner that "the base station defers sending the PEI" is predetermined by the base station and the user equipment, so the user equipment can receive the PEI in a deferring receiving manner when the conflict between the PEI and the first information or the other channel is predicted.

In an embodiment, for the above first information or the other channel, the base station and the user equipment are also capable of predetermining a processing manner as "the base station discards the PEI". Therefore, the user equipment can use a preset processing manner when the PEI is not received, for example, the user equipment can wake up before the PO corresponding to the PEI, so as to monitor whether the paging DCI exists in the PO.

Example 2.2: the PEI to be sent is in conflict with second information for which the user equipment is capable of predetermining the resource.

In an embodiment, the second information is discontinuous in the frequency domain, that is, in a comb shape in the frequency domain. It should be noted that, if the second information is discontinuous in the frequency domain, the second information and the PEI may be sent simultaneously, for example, may be sent by using the punching manner. Therefore, the base station can directly discard the PEI, or defer sending the PEI, or send the second information and the PEI in the punching manner.

For example, the second information may include at least one of following:
1. a positioning reference signal (PRS) configured by a core network or system information (SI); and
2. a tracking reference signal (TRS) sent in a broadcast manner to the user equipment in a non-connected state.

In an embodiment, in response to a conflict between the PEI to be sent and second information for which the user equipment is capable of predetermining the resource, the base station defers sending the PEI; or sends the PEI and punches the second information in the PEI. Based on this, in an embodiment, in response to the conflict between the PEI to be sent and the second information, the user equipment defers receiving the PEI; or receives the PEI at the original time-frequency position.

In an embodiment, when the punching manner is used, the base station may send both the PEI and the second information at the original time-frequency position. When encountering a resource element (RE) where the second information is located, data of the PEI information on the RE is deleted to send the second message. Based on this, the user equipment may simultaneously receive the PEI and the second information at an original time domain position.

According to the punching manner in the above embodiments, the normal sending of the PEI and the other information can be guaranteed, and an efficiency of information transmission can be improved by improving an utilization rate of frequency domain resources.

It should be noted that the processing manner that "the base station defers sending the PEI or send the PEI in the punching manner" is predetermined by the base station and the user equipment, so the user equipment can receive according to the predetermined manner when the conflict is predicted between the PEI and the second information.

In an embodiment, for the above second information, the base station and the user equipment are also capable of predetermining a processing manner as "the base station discards the PEI". Therefore, the user equipment can use a preset processing manner when the PEI is not received, for example, the user equipment can wake up before the PO corresponding to the PEI, so as to monitor whether the paging DCI exists in the PO.

It should be noted that the specific information and channel for which the user equipment is capable of predetermining the resource in the above embodiments are only examples, and in practical applications, may further include other information, or an uplink channel indicated in other manner, which is not limited in the embodiment.

So far, Example 1 and Example 2 have been completed. The base station may perform different processes according to different types of objects that is in conflict with the PEI, so as to avoid sending abnormalities of the base station and receiving abnormalities of the user equipment when the conflict exists.

In an embodiment, the base station may carry the PEI in different forms, for example, the base station may use DCI or a sequence to carry and send the PEI. For different forms of carrying the PEI, the manners of sending the PEI in the punching manner are similar, and will not be elaborated here. For different forms of carrying the PEI, the manners of deferring sending the PEI are different, which will be described as Example 3 and Example 4 below.

Example 3: the PEI is carried by the DCI.

In an embodiment, PEI can be carried in the DCI.

In an embodiment, the base station defers sending the PEI, which includes: sending the PEI on a target PDCCH for first DCI configured to send the PEI after a time domain resource corresponding to the conflict.

Based on this, in an embodiment, the user equipment may defers receiving the PEI and receives the PEI on the target PDCCH for the first DCI configured to send the PEI after the time domain resource corresponding to the conflict.

In an embodiment, the base station further makes a confirmation before deferring sending the PEI, so as to determine whether the PEI sending deferred meets a preset condition. For example, the base station can make a determination according to at least two conditions, one is whether a time interval between the first DCI and the PO corresponding to the PEI meets a preset condition; and the other is whether the first DCI is in conflict with the other information.

In an embodiment, the PEI may correspond to one or more POs, and it usually needs to determine the time interval between the first DCI and the first PO corresponding to the PEI, for example, to determine whether the first DCI is in a T duration before the first PO corresponding to the PEI. The T may be predetermined and is not limited in the embodiment.

In an embodiment, when the base station plans to defer the PEI to be sent on the target PDCCH of the first DCI, a further conflict with other information may exist. The other information may be information that the user equipment is capable of predetermining the resource for the information, or may be information that the user equipment is incapable of predetermining the resource for the information, and the base station may use different processing manners accordingly.

It should be noted that when the base station defers the sending, the selection is made based on the downlink channel, PDCC, so there will not be the cases of conflicting with the other channel as described in the above embodiments, and thus it only needs to determine whether there is a conflict with the other information.

According to the above two judgment conditions, in an embodiment, sending the PEI on the target PDCCH for the first DCI configured to send the PEI after the time domain resource corresponding to the conflict includes:
in response to a time interval between the PEI sent on the target PDCCH and a first paging occasion (PO) corresponding to the PEI meeting a target condition, and in response to no conflict with the other information, sending the PEI on the target PDCCH;

in response to the time interval between the PEI sent on the target PDCCH and the first paging occasion (PO) corresponding to the PEI not meeting the target condition, or in response to a conflict with the other information for which the user equipment is incapable of predetermining the resource, discarding the PEI;

in response to the time interval between the PEI sent on the target PDCCH and the first paging occasion (PO) corresponding to the PEI meeting the target condition, and in response to a conflict with the other information for which the user equipment is capable of predetermining the resource, deferring sending the PEI; or in response to the time interval between the PEI sent on the target PDCCH and the first paging occasion (PO) corresponding to the PEI meeting the target condition, and in response to a conflict with the other information for which the user equipment is capable of predetermining the resource, discarding the PEI.

Based on this, in an embodiment, the user equipment may perform reception accordingly, and the user equipment receives the PEI on the target PDCCH for the first DCI configured to send the PEI after the time domain resource corresponding to the conflict, which includes:

in response to a time interval between the PEI to be received on the target PDCCH and a first paging occasion (PO) corresponding to the PEI meeting a target condition, and in response to no conflict with the other information, receiving the PEI on the target PDCCH;

in response to the time interval between the PEI to be received on the target PDCCH and the first paging occasion (PO) corresponding to the PEI not meeting the target condition, or in response to a conflict with the other information, deferring receiving the PEI; or in response to the time interval between the PEI to be received on the target PDCCH and the first paging occasion (PO) corresponding to the PEI not meeting the target condition, or in response to a conflict with the other information, determining not to receive the PEI.

It should be noted that, for the user equipment, in determining whether a conflict exists, the user equipment only needs to consider "the other information for which the user equipment is capable of predetermining the resource". Therefore, the user equipment may receive correspondingly according to a strategy pre-defined with the base station. For the case where the base station defers sending the PEI, the user equipment can defer receiving the PEI. For the case where the base station discards the PEI, the user equipment can determine not to receive the PEI. In an embodiment, when the user equipment determines not to receive the PEI, it can further perform follow-up processing in a default manner, such as waking up before the PO.

So far, Example 3 has been completed. According to Example 3, when the PEI is carried by the DCI, the base station may defer sending the PEI to such a degree that the PEI is sent on the target PDCCH for the first DCI configured to send the PEI after the time domain resource corresponding to the conflict. However, for cases where the time interval between the PEI after deferring and the first PO indicated by the PEI cannot meet the condition, or the conflict still exists after deferring, the PEI may be deferred or discarded according to actual situations. Therefore, the base station has a comprehensive strategy configured to deal with the various conflict situations which can be processed flexibly to avoid sending abnormalities.

Example 4: the PEI is carried by a sequence.

In an embodiment, PEI can be carried in the sequence.

In an embodiment, the base station defers sending the PEI, which includes: sending a sequence carrying the PEI in a first downlink symbol after a time domain resource corresponding to the conflict.

Based on this, in an embodiment, the user equipment may defers receiving the PEI and receives the sequence carrying the PEI in the first downlink symbol after the time domain resource corresponding to the conflict.

Similar to the above Example 3, the base station further makes a confirmation before deferring sending the PEI, so as to determine whether the PEI sending deferred meets a preset condition. For example, the base station can make a determination according to at least two conditions, one is whether a time interval between the first downlink symbol and the PO corresponding to the PEI meets a preset condition; and the other is whether the first downlink symbol is in conflict with the other information.

In an embodiment, the PEI may indicate one or more POs, and it usually needs to determine the time interval between the first downlink symbol and the first PO corresponding to the PEI, for example, to determine whether the first downlink symbol is in a T duration before the first PO corresponding to the PEI. The T may be predetermined, for example, may be defined in the protocol, or configured by the base station, etc., and is not limited in the embodiment.

In an embodiment, when the base station plans to defer the PEI to be sent on the target PDCCH of the first downlink symbol, a further conflict with other information may exist. The other information may be information that the user equipment is capable of predetermining the resource for the information, or may be information that the user equipment is incapable of predetermining the resource for the information, and the base station may use different processing manners accordingly.

It should be noted that when the base station defers the sending of the PEI, the transmission of the PEI will be deferred to the first downlink symbol after the time domain resource corresponding to the conflict, so there will not be the cases of conflicting with the other channel as described in the above embodiments, and thus it only needs to determine whether there is a conflict with the other information.

According to the above two judgment conditions, in an embodiment, sending the sequence carrying the PEI in the first downlink symbol after the time domain resource corresponding to the conflict includes:

in response to a time interval between the PEI sent in the first downlink symbol and a first PO corresponding to the PEI meeting a target condition, and in response to no conflict with the other information, sending the sequence carrying the PEI in the first downlink symbol;

in response to the time interval between the PEI sent in the first downlink symbol and the first PO corresponding to the PEI not meeting the target condition, or in response to a conflict with the other information for which the user equipment is incapable of predetermining the resource, discarding the PEI;

in response to the time interval between the PEI sent in the first downlink symbol and the first PO corresponding to the PEI meeting the target condition, and in response to a conflict with the other information for which the user equipment is capable of predetermining the resource, deferring sending the PEI; or in response to the time interval between the PEI sent in the first downlink symbol and the first PO corresponding to the PEI meeting the target condition, and in response to a conflict with the other information for which the user equipment is capable of predetermining the resource, discarding the PEI.

Based on this, in an embodiment, the user equipment may perform reception accordingly, and the user equipment receives the sequence carrying the PEI in the first downlink symbol after the time domain resource corresponding to the conflict, which includes:

in response to a time interval between the PEI to be received in the first downlink symbol and a first PO corresponding to the PEI meeting a target condition, and in response to no conflict with the other information, receiving the sequence carrying the PEI in the first downlink symbol;

in response to the time interval between the PEI to be received in the first downlink symbol and the first PO corresponding to the PEI not meeting the target condition, or in response to a conflict with the other information, deferring receiving the PEI; or in response to the time interval between the PEI to be received in the first downlink symbol and the first PO corresponding to the PEI not meeting the target condition, or in response to a conflict with the other information, determining not to receive the PEI.

Similar to the above Example 3, for the user equipment, in determining whether a conflict exists, the user equipment only needs to consider "the other information for which the user equipment is capable of predetermining the resource". Therefore, the user equipment may receive correspondingly according to a strategy pre-defined with the base station. For the case where the base station defers sending the PEI, the user equipment can defer receiving the PEI. For the case where the base station discards the PEI, the user equipment can determine not to receive the PEI. In an embodiment, when the user equipment determines not to receive the PEI, it can further perform follow-up processing in a default manner, such as waking up before the PO.

So far, Example 4 has been completed. According to Embodiment 4, when the PEI is carried by the sequence, the base station may defer sending the PEI to such a degree that the PEI is sent in the first downlink symbol after the time domain resource corresponding to the conflict. However, for cases where the time interval between the PEI after deferring and the first PO indicated by the PEI cannot meet the condition, or the conflict still exists after deferring, the PEI may be deferred or discarded according to actual situations. Therefore, the base station has a comprehensive strategy configured to deal with the various conflict situations which can be processed flexibly to avoid sending abnormalities.

FIG. 2 is a schematic flowchart showing a method for receiving a paging early indication according to an embodiment of the present disclosure. The method for receiving the paging early indication shown in this embodiment can be performed by a terminal, and the terminal includes, but is not limited to, electronic devices such as a mobile phone, a tablet computer, a wearable device, a sensor, an Internet of Things device, etc. The terminal serving as a user equipment may communicate with a base station, and the base station includes, but is not limited to, a 4G base station, a 5G base station, or a 6G base station. In an embodiment, the base station may be a base station to which the method for sending the paging early indication is applicable described in any one of above embodiments.

As shown in FIG. 2, the method for receiving the paging early indication includes the following step.

In S201, in response to a conflict between the paging early indication (PEI) to be received and other information or other channel, a receiving manner for the PEI is determined based on the other information or the other channel.

In an embodiment, the PEI may be associated with one or more POs, and the user equipment may receive the PEI at a specified time interval (for example, a duration N) before the PO, so as to determine, according to the PEI, whether to wake up at the PO.

In an embodiment, the other information may be sent by the base station in a broadcast manner, and the user equipment is capable of predetermining the resource used for the other information sent in the broadcast manner. In another embodiment, the other channel may be pre-defined between the base station and the user equipment, or designated by the base station to the user equipment through broadcast information, and thus the user equipment is capable of predetermining the resource corresponding to the other channel. Therefore, the user equipment may determine the manner for receiving the PEI based on the other information or the other channel.

It should be noted that if the other information is sent in a non-broadcast manner such as a multicast or a unicast manner, the user equipment is incapable of predetermining the resource used for the other information sent in the non-broadcast manner. In another embodiment, if the other channel is designated to the user equipment through user equipment-specific information, the user equipment is incapable of predetermining the resources corresponding to the other channel, so the user equipment is incapable of predetermining whether the PEI is in conflict with the other information or the other channel. Therefore, the user equipment will still receive the PEI in an original manner, and if the user equipment does not receive the PEI, a predetermined default method may be used for processing. For example, in response to not receiving the PEI, the user equipment wakes up at the PO corresponding to the PEI.

In an embodiment, the receiving manner includes at least one of following: deferring receiving the PEI; or receiving the PEI at an original time-frequency position.

In an embodiment, for a case of the base station defers sending the PEI, the user equipment can defer receiving the PEI. For a case where the base station uses the punching manner to send the PEI, the user equipment can receive the PEI at the original time-frequency position.

In an embodiment, determining the receiving manner for the PEI based on the other information or the other channel includes: in response to a conflict between the PEI to be received and first information or the other channel, deferring receiving the PEI.

The first information includes at least one of following:

1. a synchronization sequence block (SSB);

2. a common search space (CSS) of a PDCCH, where the CSS is defined according to a protocol or configured by a broadcast channel, and a type of the CSS is Type0/0A/1/2; and 3. a PDSCH, where the PDSCH is configured to carry a system information block (SIB1) or broadcast system information (SI).

The other channel include: an uplink symbol indicated by an uplink/downlink configuration (UL/DL configuration) in system information.

In an embodiment, determining the receiving manner for the PEI based on the other information or the other channel includes: in response to a conflict between the PEI to be received and second information, deferring receiving the PEI, or receiving the PEI at the original time-frequency position.

The second information includes at least one of following:

1. a positioning reference signal (PRS) configured by a core network or system information (SI); and 2. a tracking reference signal (TRS) sent in a broadcast manner to the user equipment in the non-connected state.

Specific implementations for the above embodiments may refer to Example 2, which will not be repeated here. It should be noted that the above specific information and the way for determining the channel are only illustrative, and in practical applications, other information may be used or the uplink channel may be determined in other manners, which will not be elaborated in the embodiments.

According to the above embodiments, the user equipment can perform different processes according to different types of the item that is in conflict with the PEI, so as to avoid receiving abnormalities when the conflict exists.

In an embodiment, the base station may carry the PEI in different forms, for example, the base station may carry and send the PEI by the DCI or the sequence. For different forms of carrying the PEI, if the base station sends the PEI in the punching manner, the user equipment can still perform the reception at the original time-frequency position, which will not be repeated here. For different forms of carrying the PEI, the manners of deferring receiving the PEI by the user equipment are also different, which will be described as Example 5 and Example 6 below.

Example 5: the PEI is carried by the DCI.

In an embodiment, deferring receiving the PEI includes: receiving the PEI on a target PDCCH for first downlink control information (DCI) configured to send the PEI after a time domain resource corresponding to the conflict.

In an embodiment, receiving the PEI on the target PDCCH for the first DCI configured to send the PEI after the time domain resource corresponding to the conflict includes:

in response to a time interval between the PEI to be received on the target PDCCH and a first paging occasion (PO) corresponding to the PEI meeting a target condition, and in response to no conflict with the other information, receiving the PEI on the target PDCCH;

in response to the time interval between the PEI to be received on the target PDCCH and the first paging occasion (PO) corresponding to the PEI not meeting the target condition, or in response to a conflict with the other information, deferring receiving the PEI; or in response to the time interval between the PEI to be received on the target PDCCH and the first paging occasion (PO) corresponding to the PEI not meeting the target condition, or in response to a conflict with the other information, determining not to receive the PEI.

Specific implementations for the above Example 5 may refer to Example 3, which will not be repeated here. According to Example 3, if the base station carries the PEI by the DCI, the user equipment can receive the PEI on the target PDCCH for the first DCI configured to send the PEI after the time domain resource corresponding to the conflict. However, for cases where the time interval between the PEI after deferring and the first PO indicated by the PEI cannot meet the condition, or the conflict still exists after deferring, the reception of the PEI may be deferred or it may be determined not to receive the PEI according to the actual situation, and the user equipment may perform processes according to the method pre-defined with the base station. Therefore, the user equipment has a comprehensive strategy configured to deal with the various conflict situations which can be processed flexibly to avoid receiving abnormalities.

Example 6: the PEI is carried by the sequence.

In an embodiment, deferring receiving the PEI includes: receiving a sequence carrying the PEI in a first downlink symbol after a time domain resource corresponding to the conflict.

In an embodiment, receiving the sequence carrying the PEI in the first downlink symbol after the time domain resource corresponding to the conflict includes:

in response to a time interval between the PEI to be received in the first downlink symbol and a first PO corresponding to the PEI meeting a target condition, and in response to no conflict with the other information, receiving the sequence carrying the PEI in the first downlink symbol;

in response to the time interval between the PEI to be received in the first downlink symbol and the first PO corresponding to the PEI not meeting the target condition, or in response to a conflict with the other information, deferring receiving the PEI; or in response to the time interval between the PEI to be received in the first downlink symbol and the first PO corresponding to the PEI not meeting the target condition, or in response to a conflict with the other information, determining not to receive the PEI.

Specific implementations for the above Example 6 may refer to Example 4, which will not be repeated here. According to Example 6, if the base station carries the PEI by the sequence, the user equipment may receive the PEI in the first downlink symbol after the time domain resource corresponding to the conflict. However, for cases where the time interval between the PEI after deferring and the first PO indicated by the PEI cannot meet the condition, or the conflict still exists, the reception of the PEI may be deferred or it may be determined not to receive the PEI according to the actual situations. Therefore, the user equipment has a comprehensive strategy configured to deal with the various conflict situations which can be processed flexibly to avoid receiving abnormalities.

In an embodiment, if the user equipment does not receive the PEI, for example, a conflict that the user equipment cannot predict occurs, the user equipment may keep receiving the PEI (but the PEI is not received). In another embodiment, when the user equipment determines not to receive the PEI, in response to not receiving the PEI, the user equipment wakes up at the PO corresponding to the PEI. Therefore, the user equipment can wake up before the PO to monitor whether the paging DCI is transmitted even if the PEI is not received, so as to avoid missing the paging DCI.

Corresponding to the foregoing embodiments of the method for sending the paging early indication, the present disclosure provides embodiments of an apparatus for sending a paging early indication.

FIG. 3 is a schematic block diagram showing an apparatus for sending a paging early indication according to an embodiment of the present disclosure. The apparatus for sending the paging early indication shown in this embodiment can be applied to a base station, and the base station includes, but is not limited to, a 4G base station, a 5G base station, or a 6G base station. The base station may communicate with a terminal serving as a user equipment, and the user equipment includes, but is not limited to, electronic devices such as a mobile phone, a tablet computer, a wearable device, a sensor, an Internet of Things device, etc. In an embodiment, the user equipment may be any user equipment to which an apparatus for receiving a paging early indication is applicable described in any one of subsequent embodiments.

As shown in FIG. 3, the apparatus for sending the paging early indication includes an indication sending module 301 configured to, in response to a conflict between the paging early indication (PEI) to be sent and other information or other channel, determining a processing manner for the PEI based on the other information or the other channel.

In an embodiment, the other information or the other channel include at least one of following: the other information or the other channel for which a user equipment is capable of predetermining a resource, and the other information or the other channel for which the user equipment is incapable of predetermining the resource.

In an embodiment, in response to the other information or the other channel being that for which the user equipment is incapable of predetermining the resource, the processing manner includes discarding the PEI.

In an embodiment, the other information for which the user equipment is incapable of predetermining the resource includes at least one of following: a physical downlink shared channel (PDSCH) sent in a multicast manner to the user equipment in a non-connected state; a physical downlink control channel (PDCCH) or the physical downlink shared channel (PDSCH) sent to the user equipment in a connected state; a channel state information reference signal (CSI-RS) or a user equipment specific positioning reference signal (UE specific PRS) sent to the user equipment in the connected state; and a remote interference management reference signal (RIM-RS).

The other channel for which the user equipment is incapable of predetermining the resource include at least one of following: an uplink symbol indicated by a user equipment specific uplink/downlink configuration (UE specific UL/DL configuration); and an uplink symbol indicated by a slot format indication (SFI).

In an embodiment, in response to the other information or the other channel being that for which the user equipment is capable of predetermining the resource, the processing manner includes at least one of following: discarding the PEI; deferring sending the PEI; and sending the PEI and punching the other information in the PEI.

In an embodiment, in response to a conflict between the PEI to be sent and first information for which the user equipment is capable of predetermining the resource, or between the PEI to be sent and the other channel for which the user equipment is capable of predetermining the resource, sending the PEI is deferred.

The first information includes at least one of following: a synchronization sequence block (SSB); a common search space (CSS) of a PDCCH, where the CSS is defined according to a protocol or configured by a broadcast channel, and a type of the CSS is Type0/0A/1/2; and a PDSCH, where the PDSCH is configured to carry a system information block (SIB1) or broadcast system information (SI).

The other channel for which the user equipment is capable of predetermining the resource include: an uplink symbol indicated by uplink/downlink configuration (UL/DL configuration) in system information.

In an embodiment, in response to a conflict between the PEI to be sent and second information for which the user equipment is capable of predetermining the resource, deferring sending the PEI; or sending the PEI and punching the second information in the PEI.

The second information includes at least one of following: a positioning reference signal (PRS) configured by a core network or system information (SI); and a tracking reference signal (TRS) sent in a broadcast manner to the user equipment in the non-connected state.

In an embodiment, deferring sending the PEI includes: sending the PEI on a target PDCCH for first downlink control information (DCI) configured to send the PEI after a time domain resource corresponding to the conflict.

In an embodiment, sending the PEI on the target PDCCH for the first DCI configured to send the PEI after the time domain resource corresponding to the conflict includes:

in response to a time interval between the PEI sent on the target PDCCH and a first paging occasion (PO) corresponding to the PEI meeting a target condition, and in response to no conflict with the other information, sending the PEI on the target PDCCH;

in response to the time interval between the PEI sent on the target PDCCH and the first paging occasion (PO) corresponding to the PEI not meeting the target condition, or in response to a conflict with the other information for which the user equipment is incapable of predetermining the resource, discarding the PEI;

in response to the time interval between the PEI sent on the target PDCCH and the first paging occasion (PO) corresponding to the PEI meeting the target condition, and in response to a conflict with the other information for which the user equipment is capable of predetermining the resource, deferring sending the PEI; or in response to the time interval between the PEI sent on the target PDCCH and the first paging occasion (PO) corresponding to the PEI meeting the target condition, and in response to a conflict with the other information for which the user equipment is capable of predetermining the resource, discarding the PEI.

In an embodiment, deferring sending the PEI includes: sending a sequence carrying the PEI in a first downlink symbol after a time domain resource corresponding to the conflict.

In an embodiment, sending the sequence carrying the PEI in the first downlink symbol after the time domain resource corresponding to the conflict includes:

in response to a time interval between the PEI sent in the first downlink symbol and a first PO corresponding to the PEI meeting a target condition, and in response to no conflict with the other information, sending the sequence carrying the PEI in the first downlink symbol;

in response to the time interval between the PEI sent in the first downlink symbol and the first PO corresponding to the PEI not meeting the target condition, or in response to a conflict with the other information for which the user equipment is incapable of predetermining the resource, discarding the PEI;

in response to the time interval between the PEI sent in the first downlink symbol and the first PO corresponding to the PEI meeting the target condition, and in response to a conflict with the other information for which the user equipment is capable of predetermining the resource, deferring sending the PEI; or in response to the time interval between the PEI sent in the first downlink symbol and the first PO corresponding to the PEI meeting the target condition, and in response to a conflict with the other information for which the user equipment is capable of predetermining the resource, discarding the PEI.

Corresponding to the foregoing embodiments of the method for receiving the paging early indication, the present disclosure provides embodiments of an apparatus for receiving a paging early indication.

FIG. 4 is a schematic block diagram showing an apparatus for receiving a paging early indication according to an embodiment of the present disclosure. The apparatus for receiving the paging early indication shown in this embodiment can be applied to a terminal serving as a user equipment, and the user equipment includes, but is not limited to, electronic devices such as a mobile phone, a tablet computer, a wearable device, a sensor, an Internet of Things device, etc. The user equipment may communicate with a base station, and the base station includes, but is not limited to, a 4G base station, a 5G base station, or a 6G base station. In an embodiment, the base station may be a base station to which the apparatus for sending the paging early indication is applicable described in any one of above embodiments.

As shown in FIG. 4, the apparatus for receiving the paging early indication includes an indication receiving module 401 configured to, in response to a conflict between the paging early indication (PEI) to be received and other information or other channel, determining a receiving manner for the PEI based on the other information or the other channel.

In an embodiment, the receiving manner includes at least one of following: deferring receiving the PEI; or receiving the PEI at an original time-frequency position.

In an embodiment, determining the receiving manner for the PEI based on the other information or the other channel includes: in response to a conflict between the PEI to be received and first information or the other channel, deferring receiving the PEI.

The first information includes at least one of following: a synchronization sequence block (SSB); a common search space (CSS) of a PDCCH, where the CSS is defined according to a protocol or configured by a broadcast channel, and a type of the CSS is Type0/0A/1/2; and a PDSCH, where the PDSCH is configured to carry a system information block (SIB1) or broadcast system information (SI).

The other channel include: an uplink symbol indicated by an uplink/downlink configuration (UL/DL configuration) in system information.

In an embodiment, determining the receiving manner for the PEI based on the other information or the other channel includes: in response to a conflict between the PEI to be received and second information, deferring receiving the PEI, or receiving the PEI at the original time-frequency position.

The second information includes at least one of following: a positioning reference signal (PRS) configured by a core network or system information (SI); and a tracking reference signal (TRS) sent in a broadcast manner to the user equipment in a non-connected state.

In an embodiment, deferring receiving the PEI includes: receiving the PEI on a target PDCCH for first downlink control information (DCI) configured to send the PEI after a time domain resource corresponding to the conflict.

In an embodiment, receiving the PEI on the target PDCCH for the first DCI configured to send the PEI after the time domain resource corresponding to the conflict includes:

in response to a time interval between the PEI to be received on the target PDCCH and a first paging occasion (PO) corresponding to the PEI meeting a target condition, and in response to no conflict with the other information, receiving the PEI on the target PDCCH;

in response to the time interval between the PEI to be received on the target PDCCH and the first paging occasion (PO) corresponding to the PEI not meeting the target condition, or in response to a conflict with the other information, deferring receiving the PEI; or in response to the time interval between the PEI to be received on the target PDCCH and the first paging occasion (PO) corresponding to the PEI not meeting the target condition, or in response to a conflict with the other information, determining not to receive the PEI.

In an embodiment, deferring receiving the PEI includes: receiving a sequence carrying the PEI in a first downlink symbol after a time domain resource corresponding to the conflict.

In an embodiment, receiving the sequence carrying the PEI in the first downlink symbol after the time domain resource corresponding to the conflict includes:

in response to a time interval between the PEI to be received in the first downlink symbol and a first PO corresponding to the PEI meeting a target condition, and in response to no conflict with the other information, receiving the sequence carrying the PEI in the first downlink symbol;

in response to the time interval between the PEI to be received in the first downlink symbol and the first PO corresponding to the PEI not meeting the target condition, or in response to a conflict with the other information, deferring receiving the PEI; or in response to the time interval between the PEI to be received in the first downlink symbol and the first PO corresponding to the PEI not meeting the target condition, or in response to a conflict with the other information, determining not to receive the PEI.

FIG. 5 is a schematic block diagram showing another apparatus for receiving a paging early indication according to an embodiment of the present disclosure. As shown in FIG. 5, the apparatus further includes a waking up module 501 configured to, in response to not receiving the PEI, waking up at a PO corresponding to the PEI.

With respect to the apparatuses in the above embodiments, specific manners for individual modules to perform operations/steps have been described in detail in the embodiments related to the methods of the present disclosure, which will not be elaborated herein.

Since the apparatus embodiments substantially correspond to the method embodiments, reference is made to the description of the method embodiments. The above-described apparatus embodiments are merely for the purpose of illustration, in which the modules described as separate components may be or may not be physically separated, and the components displayed as modules may be or may not be physical modules, that is, either located at one place or distributed onto a plurality of network modules. The object of embodiments of the present disclosure may be achieved by some or all of the modules in accordance with practical requirements, which would be appreciated and executable by those skilled in the art without creative efforts.

With combination to the following specific technical details, specific sending and receiving principles for the functions of the present disclosure are generally described as follows.

The PEI may be carried in forms of DCI and a sequence.

Conflicts between the PEI and other channel/signal are classified into two types. The first type is that a UE is capable of predicting an occurrence of the conflict. The second type is that the UE is incapable of predicting the occurrence of the conflict.

Specific cases included in the first type of the conflict situation include:

Case 1-1, the PEI+a SSB;

Case 1-2, the PEI+a Type0/0A/1/2 PDCCH CSS defined according to a protocol or configured by a broadcast channel;

Case 1-3, the PEI+a PDSCH carried with a SIB1 or SI (system information);

Case 1-4, the PEI+an uplink symbol indicated by UL-DL configuration configured in a system message;

Case 1-5, the PEI+a positioning reference signal (PRS) configured by a core network or a system message;

Case 1-6, the PEI+a broadcast TRS (tracking RS) configured to a UE in a RRC-idle state.

Specific cases included in the second type of the conflict situation include:

Case 2-1, the PEI+a PDSCH multicast to a UE in a RRC-idle state (for example, the PDSCH carrying an RAR/a paging message);

Case 2-2, the PEI+PDCCH configuration/PDSCH scheduling of RRC connected UE;

Case 2-3, the PEI+a CSI-RS/UE specific PRS of RRC connected UE;

Case 2-4, the PEI+an uplink symbol in a UE specific UL/DL configuration/SFI (slot format indication, allocated by a uplink/downlink resource indicated dynamically by UE-specific DCI);

Case 2-5, the PEI+a remote interference management reference signal (RIM-RS).

For the second type of the conflict situation, since the UE does not know that the conflict has occurred, the base station can only discard the PEI. When the user equipment does not detect the PEI, a default UE operation is needed, such as waking up.

For the first type of the conflict situation, the UE is capable of predicting that the conflict will occur, so the base station can discard the PEI or defer/punch in the PEI.

In the case where the PEI is discarded, as above, when no PEI is detected, the default operation of the user equipment needs to be pre-defined, such as waking up.

In the case where the PEI is deferred/punched in, operations for different cases are described as follows.

In the case where the PEI is the DCI

For the case 1-1/2/3/4, the PEI can be deferred to be transmitted on a first PDCCH channel configured to send PEI-DCI after a conflict symbol. If after the defer, the PEI cannot meet a condition that there is a duration T before a first PO corresponding to the PEI, or the second type of the conflict still occurs, and the base station will discard the PEI. If the first type of the conflict further occurs after deferring, the base station can continue to defer or discard the PEI.

A specific value of the above duration T may be configured by the base station or defined in a protocol.

For the case 1-5/6, since the two reference signals are comb-shaped and do not occupy continuous resource elements (REs) in a frequency domain, deferring or punching manner may be used. The deferring manner is the same as above. The punching manner is to send the PEI directly at its original location, but when encountering a RE where the RS is located, symbol(s) of the PEI in the RE is deleted.

In the case where the PEI is a sequence

For the case 1-1/2/3/4, the PEI can be deferred to a first downlink symbol after the conflict symbol. If after deferring, the PEI cannot meet a condition that there is a duration T before a first PO corresponding to the PEI, or the second type of the conflict still occurs, the base station will discard the PEI. If the first type of the conflict further occurs after deferring, the base station can continue to defer or discard the PEI.

For the case 1-5/6, since the two reference signals are comb-shaped and do not occupy continuous REs in a frequency domain, the deferring or punching manner may be used.

An electronic device is provided in the embodiments of the present disclosure, including: a processor; and a memory configured to store instructions executable by the processor. The processor is configured to implement the above-described method for sending the paging early indication and/or the method for receiving the paging early indication.

A computer-readable storage medium is provided in the embodiments of the present disclosure, having stored therein computer programs that, when executed by a processor, cause step(s) in the above-described method for sending the paging early indication and/or the method for receiving the paging early indication to be implemented.

Figure 6:
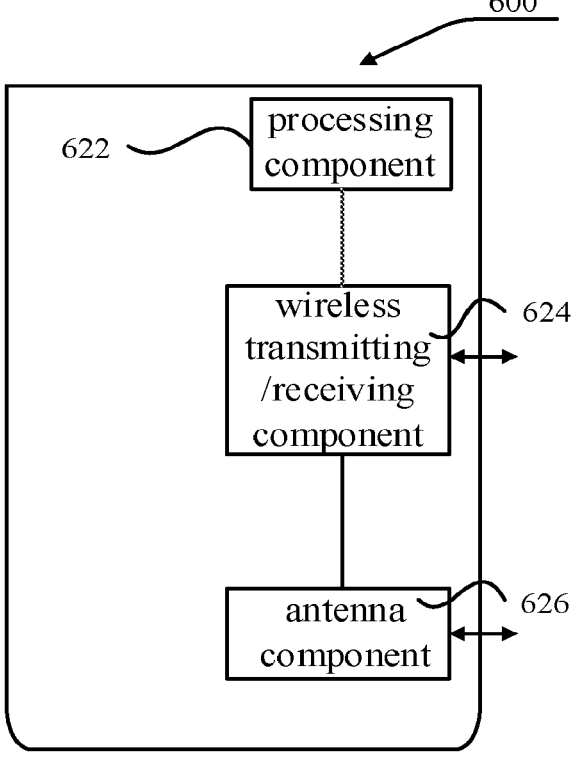
FIG. 6 is a schematic block diagram showing a device for sending a paging early indication according to an embodiment of the present disclosure.

As shown in FIG. 6, FIG. 6 is a schematic block diagram showing a device 600 for sending a paging early indication according to an embodiment of the present disclosure. The device 600 may be provided as a base station. Referring to FIG. 6, the device 600 includes a processing component 622, a wireless transmitting/receiving component 624, an antenna component 626, and a signal processing part specific to a wireless interface. The processing component 622 may further include one or more processors. One of the processors in the processing component 622 may be configured to implement the method for sending the paging early indication.

Figure 7:
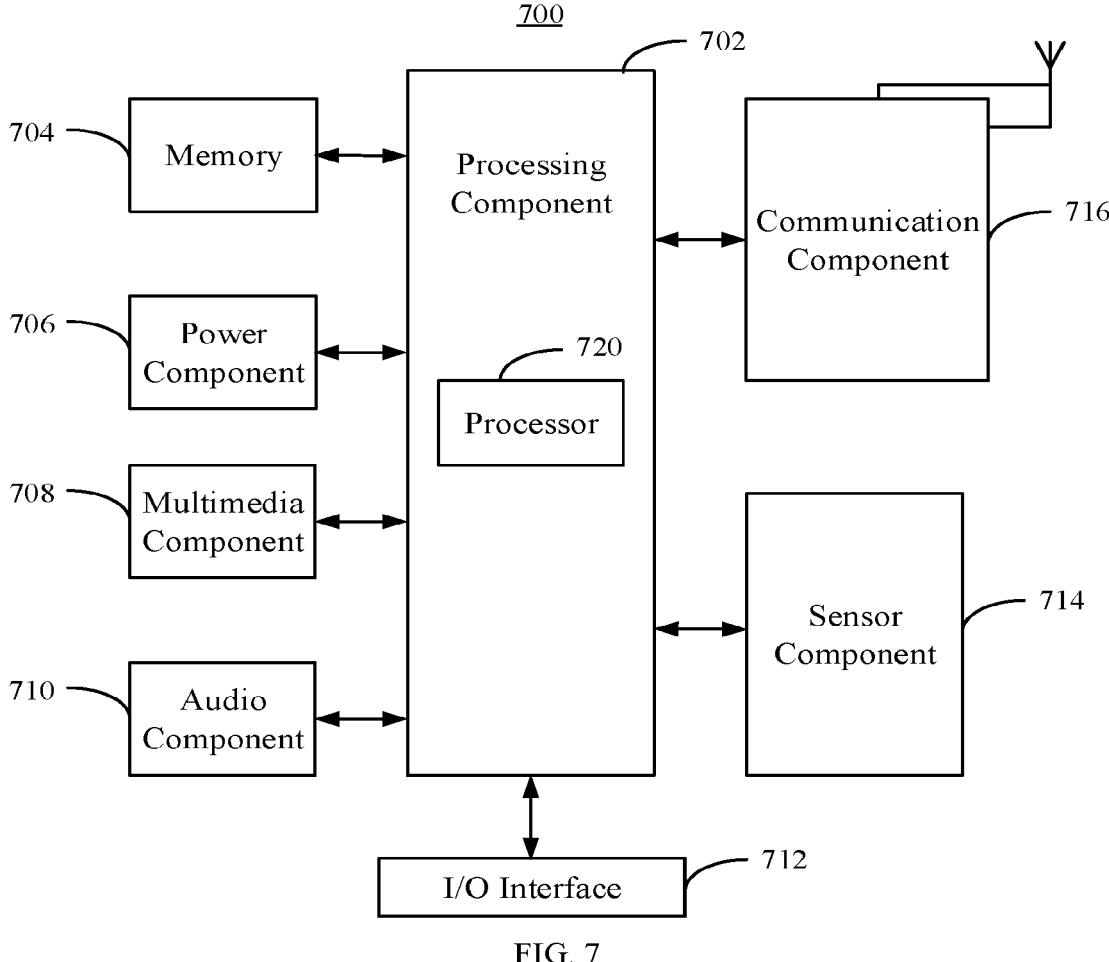
FIG. 7 is a schematic block diagram showing a device for receiving a paging early indication according to an embodiment of the present disclosure.

FIG. 7 is a schematic block diagram showing a device 700 for receiving a paging early indication according to an embodiment of the present disclosure. For example, the device 700 may be a mobile phone, a computer, a digital broadcast terminal, a messaging device, a game console, a tablet device, a medical device, a fitness device, a personal digital assistant, or the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, phone calls, data communications, camera operations, and recording operations. The processing component 702 can include one or more processors 720 to execute instructions to perform all or some of the steps in the above-described methods for the receiving the paging early indication. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, videos, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the device 700 is in an operation mode, such as a call mode, a recording mode, and a voice recognition mode. The received audio signal may be further stored in the memory 704 or sent via the communication component 716. In some embodiments, the audio component 710 further includes a speaker to output audio signals.

The I/O interface 712 provides an interface between the processing component 702 and peripheral interface modules, such as keyboards, click wheels, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700. The sensor component 714 may also detect a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may further include a light sensor, such as a CMOS or CCD image sensor, for use in imaging applications. In some embodiments, the sensor component 714 may further include an accelerometer sensor, a gyroscope sensor, a magnetic sensor, a pressure sensor, or a temperature sensor.

The communication component 716 is configured to facilitate communication, wired or wireless, between the device 700 and other devices. The device 700 can access a wireless network based on any communication standard, such as WiFi, 2G or 3G, 4G LTE, 5G NR or a combination thereof. In an illustrative embodiment, the communication component 716 receives a broadcast signal or broadcast associated information from an external broadcast management system via a broadcast channel. In an illustrative embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the device 700 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic elements, for performing the above-mentioned method for the receiving of the paging early indication.

In an illustrative embodiment, there is also provided a non-transitory computer readable storage medium including instructions, such as included in the memory 704, executable by the processor 720 in the device 700, for completing the above-mentioned method for the receiving of the paging early indication. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

It is to be noted that in this context, relational terms such as first and second are used solely to distinguish one entity or operation from another entity or operation, it does not necessarily require or imply any such actual relationship or sequence between these entities or operations. The term "include", "comprise" or any other variations thereof refers to a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

The methods, apparatus and devices provided by the embodiments of the present disclosure have been described in detail above, and specific examples are used herein to illustrate the principle and implementations of the present disclosure. The description of the above embodiments is only used to help understand the methods and core ideas of the present disclosure. At the same time, for those skilled in the art, some changes may be made in the specific implementation and application scope according to the idea of the present disclosure. Therefore, the content of the specification should not be construed as a limitation on the present disclosure.

Obviously, numerous modifications and variations of the present disclosure are possible in light of the above teachings. It is therefore to be understood that within the scope of the appended claims, the disclosure may be practiced otherwise than as specifically described herein.

What is claimed is:

1. A method for sending a paging early indication (PEI), performed by a base station and comprising:

in response to a conflict between the PEI to be sent and other information or other channel, determining a processing manner for the PEI based on the other information or the other channel;

wherein the other information or the other channel comprises at least one of following:

the other information or the other channel for which a user equipment is capable of predetermining a resource, and the other information or the other channel for which the user equipment is incapable of predetermining the resource;

wherein in response to the other information or the other channel being that for which the user equipment is incapable of predetermining the resource, the processing manner comprises:

discarding the PEI, wherein the other information for which the user equipment is incapable of predetermining the resource comprises at least one of following:

a physical downlink shared channel (PDSCH) sent in a multicast manner to the user equipment in a non-connected state;

a physical downlink control channel (PDCCH) or a physical downlink shared channel (PDSCH) sent to the user equipment in a connected state;

a channel state information reference signal (CSI-RS) or a user equipment specific positioning reference signal (UE specific PRS) sent to the user equipment in the connected state; and a remote interference management reference signal (RIM-RS); and wherein the other channel for which the user equipment is incapable of predetermining the resource comprises at least one of following:

an uplink symbol indicated by a user equipment specific uplink/downlink configuration (UE specific UL/DL configuration); and an uplink symbol indicated by a slot format indication (SFI).

2. The method according to claim 1, wherein in response to the other information or the other channel being that for which the user equipment is capable of predetermining the resource, the processing manner comprises at least one of following:

discarding the PEI;

deferring sending the PEI; and sending the PEI and punching the other information in the PEI.

3. The method according to claim 2, wherein in response to a conflict between the PEI to be sent and first information for which the user equipment is capable of predetermining the resource, or between the PEI to be sent and the other channel for which the user equipment is capable of predetermining the resource, sending the PEI is deferred;

wherein the first information comprises at least one of following:

a synchronization sequence block (SSB);

a common search space (CSS) of a PDCCH, wherein the CSS is defined according to a protocol or configured by a broadcast channel, and a type of the CSS is Type0/0A/1/2; and a PDSCH, wherein the PDSCH is configured to carry a system information block (SIB1) or broadcast system information (SI); and wherein the other channel for which the user equipment is capable of predetermining the resource comprises: an uplink symbol indicated by uplink/downlink configuration (UL/DL configuration) in system information.

4. The method according to claim 2, wherein in response to a conflict between the PEI to be sent and second information for which the user equipment is capable of predetermining the resource, sending the PEI is deferred, or the PEI is sent and the second information is punched in the PEI;

wherein the second information comprises at least one of following:

a positioning reference signal (PRS) configured by a core network or system information (SI); and a tracking reference signal (TRS) sent in a broadcast manner to the user equipment in a non-connected state.

5. The method according to claim 2, wherein deferring sending the PEI comprises:

sending the PEI on a target PDCCH for first downlink control information (DCI) configured to send the PEI after a time domain resource corresponding to the conflict.

6. The method according to claim 5, wherein sending the PEI on the target PDCCH for the first DCI configured to send the PEI after the time domain resource corresponding to the conflict comprises:

in response to a time interval between the PEI sent on the target PDCCH and a first paging occasion (PO) corresponding to the PEI meeting a target condition, and in response to no conflict with the other information, sending the PEI on the target PDCCH;

in response to the time interval between the PEI sent on the target PDCCH and the first PO corresponding to the PEI not meeting the target condition, or in response to a conflict with the other information for which the user equipment is incapable of predetermining the resource, discarding the PEI;

in response to the time interval between the PEI sent on the target PDCCH and the first PO corresponding to the PEI meeting the target condition, and in response to a conflict with the other information for which the user equipment is capable of predetermining the resource, deferring sending the PEI;

or in response to the time interval between the PEI sent on the target PDCCH and the first PO corresponding to the PEI meeting the target condition, and in response to a conflict with the other information for which the user equipment is capable of predetermining the resource, discarding the PEI.

7. The method according to claim 2, wherein deferring sending the PEI comprises:

sending a sequence carrying the PEI in a first downlink symbol after a time domain resource corresponding to the conflict.

8. The method according to claim 7, wherein sending the sequence carrying the PEI in the first downlink symbol after the time domain resource corresponding to the conflict comprises:

in response to a time interval between the PEI sent in the first downlink symbol and a first PO corresponding to the PEI meeting a target condition, and in response to no conflict with the other information, sending the sequence carrying the PEI in the first downlink symbol;

in response to the time interval between the PEI sent in the first downlink symbol and the first PO corresponding to the PEI not meeting the target condition, or in response to a conflict with the other information for which the user equipment is incapable of predetermining the resource, discarding the PEI;

in response to the time interval between the PEI sent in the first downlink symbol and the first PO corresponding to the PEI meeting the target condition, and in response to a conflict with the other information for which the user equipment is capable of predetermining the resource, deferring sending the PEI;

or in response to the time interval between the PEI sent in the first downlink symbol and the first PO corresponding to the PEI meeting the target condition, and in response to a conflict with the other information for which the user equipment is capable of predetermining the resource, discarding the PEI.

9. A method for receiving a paging early indication (PEI), performed by a user equipment and comprising:

in response to a conflict between the PEI to be received and other information or other channel, determining a receiving manner for the PEI based on the other information or the other channel;

wherein the receiving manner comprises at least one of following:

deferring receiving the PEI; or receiving the PEI at an original time-frequency position, wherein determining the receiving manner for the PEI based on the other information or the other channel comprises:

in response to a conflict between the PEI to be received and first information or the other channel, deferring receiving the PEI;

wherein the first information comprises at least one of following:

a synchronization sequence block (SSB);

a common search space (CSS) of a PDCCH, wherein the CSS is defined according to a protocol or configured by a broadcast channel, and a type of the CSS is Type0/0A/1/2; and a PDSCH, wherein the PDSCH is configured to carry a system information block (SIB1) or broadcast system information (SI); and wherein the other channel comprises: an uplink symbol indicated by an uplink/downlink configuration (UL/DL configuration) in system information;

or wherein determining the receiving manner for the PEI based on the other information or the other channel comprises:

in response to a conflict between the PEI to be received and second information, deferring receiving the PEI, or receiving the PEI at the original time-frequency position; wherein the second information comprises at least one of following:

a positioning reference signal (PRS) configured by a core network or system information (SI); and a tracking reference signal (TRS) sent to the user equipment in a non-connected state in a broadcast manner.

10. The method according to claim 9, wherein deferring receiving the PEI comprises:

receiving the PEI on a target PDCCH for first downlink control information (DCI) configured to send the PEI after a time domain resource corresponding to the conflict.

11. The method according to claim 10, wherein receiving the PEI on the target PDCCH for the first DCI configured to send the PEI after the time domain resource corresponding to the conflict comprises:

in response to a time interval between the PEI to be received on the target PDCCH and a first paging occasion (PO) corresponding to the PEI meeting a target condition, and in response to no conflict with the other information, receiving the PEI on the target PDCCH;

in response to the time interval between the PEI to be received on the target PDCCH and the first PO corresponding to the PEI not meeting the target condition, or in response to a conflict with the other information, deferring receiving the PEI;

or in response to the time interval between the PEI to be received on the target PDCCH and the first PO corresponding to the PEI not meeting the target condition, or in response to a conflict with the other information, determining not to receive the PEI.

12. The method according to claim 9, wherein deferring receiving the PEI comprises:

receiving a sequence carrying the PEI in a first downlink symbol after a time domain resource corresponding to the conflict, comprising:

in response to a time interval between the PEI to be received in the first downlink symbol and a first PO corresponding to the PRI meeting a target condition, and in response to no conflict with the other information, receiving the sequence carrying the PEI in the first downlink symbol;

in response to the time interval between the PEI to be received in the first downlink symbol and the first PO corresponding to the PEI not meeting the target condition, or in response to a conflict with the other information, deferring receiving the PEI;

or in response to the time interval between the PEI to be received in the first downlink symbol and the first PO corresponding to the PEI not meeting the target condition, or in response to a conflict with the other information, determining not to receive the PEI.

13. The method according to claim 9, further comprising:

in response to not receiving the PEI, waking up at a PO corresponding to the PEI.

14. An electronic device, comprising:

a processor;

a memory configured to store instructions executable by the processor;

wherein the processor is configured to implement the method for receiving the paging early indication according to claim 9.

15. An electronic device, comprising:

a processor;

a memory configured to store instructions executable by the processor;

wherein the processor is configured to implement a method for sending a paging early indication (PEI) comprising:

in response to a conflict between the PEI to be sent and other information or other channel, determining a processing manner for the PEI based on the other information or the other channel;

wherein the other information or the other channel comprises at least one of following:

the other information or the other channel for which a user equipment is capable of predetermining a resource, and the other information or the other channel for which the user equipment is incapable of predetermining the resource;

wherein in response to the other information or the other channel being that for which the user equipment is incapable of predetermining the resource, the processing manner comprises:

discarding the PEI, wherein the other information for which the user equipment is incapable of predetermining the resource comprises at least one of following:

a physical downlink shared channel (PDSCH) sent in a multicast manner to the user equipment in a non-connected state;

a physical downlink control channel (PDCCH) or a physical downlink shared channel (PDSCH) sent to the user equipment in a connected state;

a channel state information reference signal (CSI-RS) or a user equipment specific positioning reference signal (UE specific PRS) sent to the user equipment in the connected state; and a remote interference management reference signal (RIM-RS); and wherein the other channel for which the user equipment is incapable of predetermining the resource comprises at least one of following:

an uplink symbol indicated by a user equipment specific uplink/downlink configuration (UE specific UL/DL configuration); and an uplink symbol indicated by a slot format indication (SFI).

\* \* \* \* \*